United States Patent
Ikeda et al.

(10) Patent No.: US 11,120,291 B2
(45) Date of Patent: Sep. 14, 2021

(54) EXTRANEOUS-MATTER DETECTING APPARATUS AND EXTRANEOUS-MATTER DETECTING METHOD

(71) Applicant: DENSO TEN Limited, Kobe (JP)

(72) Inventors: Nobuhisa Ikeda, Kobe (JP); Nobunori Asayama, Kobe (JP); Takashi Kono, Kobe (JP); Yasushi Tani, Kobe (JP); Daisuke Yamamoto, Kobe (JP); Tomokazu Oki, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 125 days.

(21) Appl. No.: 16/566,422

(22) Filed: Sep. 10, 2019

(65) Prior Publication Data
US 2020/0210751 A1 Jul. 2, 2020

(30) Foreign Application Priority Data
Dec. 28, 2018 (JP) .............................. JP2018-247679

(51) Int. Cl.
*G06K 9/46* (2006.01)
*G06K 9/00* (2006.01)

(52) U.S. Cl.
CPC ....... *G06K 9/4661* (2013.01); *G06K 9/00791* (2013.01); *G06K 9/4647* (2013.01)

(58) Field of Classification Search
CPC . G06K 9/4661; G06K 9/4647; G06K 9/00791
See application file for complete search history.

(56) References Cited

U.S. PATENT DOCUMENTS

| 6,762,800 | B1 | 7/2004 | Nie et al. |
| 2013/0027557 | A1* | 1/2013 | Hirai ................... G06K 9/00791 348/148 |

(Continued)

FOREIGN PATENT DOCUMENTS

| JP | 4071527 B2 | 4/2008 |
| JP | 2010-218046 A | 9/2010 |

(Continued)

OTHER PUBLICATIONS

Mar. 25, 2021 Office Action issued in U.S. Appl. No. 16/567,070.

*Primary Examiner* — Edward F Urban
*Assistant Examiner* — Wassim Mahrouka
(74) *Attorney, Agent, or Firm* — Oliff PLC

(57) ABSTRACT

An extraneous-matter detecting apparatus includes a region setting unit, a computing unit, a change-value setting unit, an updating unit, and a detection unit. The region setting unit sets divided regions for a captured image captured by an image capturing device. The computing unit computes, for a corresponding divided region, a first difference between a past representative value of luminance and a present representative value of luminance and a second difference between a past dispersion amount of luminance and a present dispersion amount of luminance. The change-value setting unit sets, based on the first and the second differences, a change value of a counter value that indicates an adhesion state of an extraneous matter in the divided region. The updating unit updates the counter value based on the change value. The detection unit detects, based on the counter value, an adhesion state of an extraneous matter in the divided region.

5 Claims, 5 Drawing Sheets

(56) References Cited

U.S. PATENT DOCUMENTS

| | | | |
|---|---|---|---|
| 2014/0010408 A1 | 1/2014 | Irie et al. | |
| 2014/0028849 A1* | 1/2014 | Tsuchiya | B60R 1/00 |
| | | | 348/148 |
| 2014/0029008 A1* | 1/2014 | Hirai | G01N 21/552 |
| | | | 356/445 |
| 2015/0069224 A1* | 3/2015 | Yoshimura | B60S 1/0833 |
| | | | 250/227.14 |
| 2016/0100088 A1* | 4/2016 | Sekiguchi | G06K 9/209 |
| | | | 701/48 |
| 2018/0114089 A1* | 4/2018 | Ikeda | B60R 1/00 |

FOREIGN PATENT DOCUMENTS

| | | |
|---|---|---|
| JP | 2014-030188 A | 2/2014 |
| JP | 2018-071994 A | 5/2018 |
| JP | 2018-191087 A | 11/2018 |

\* cited by examiner

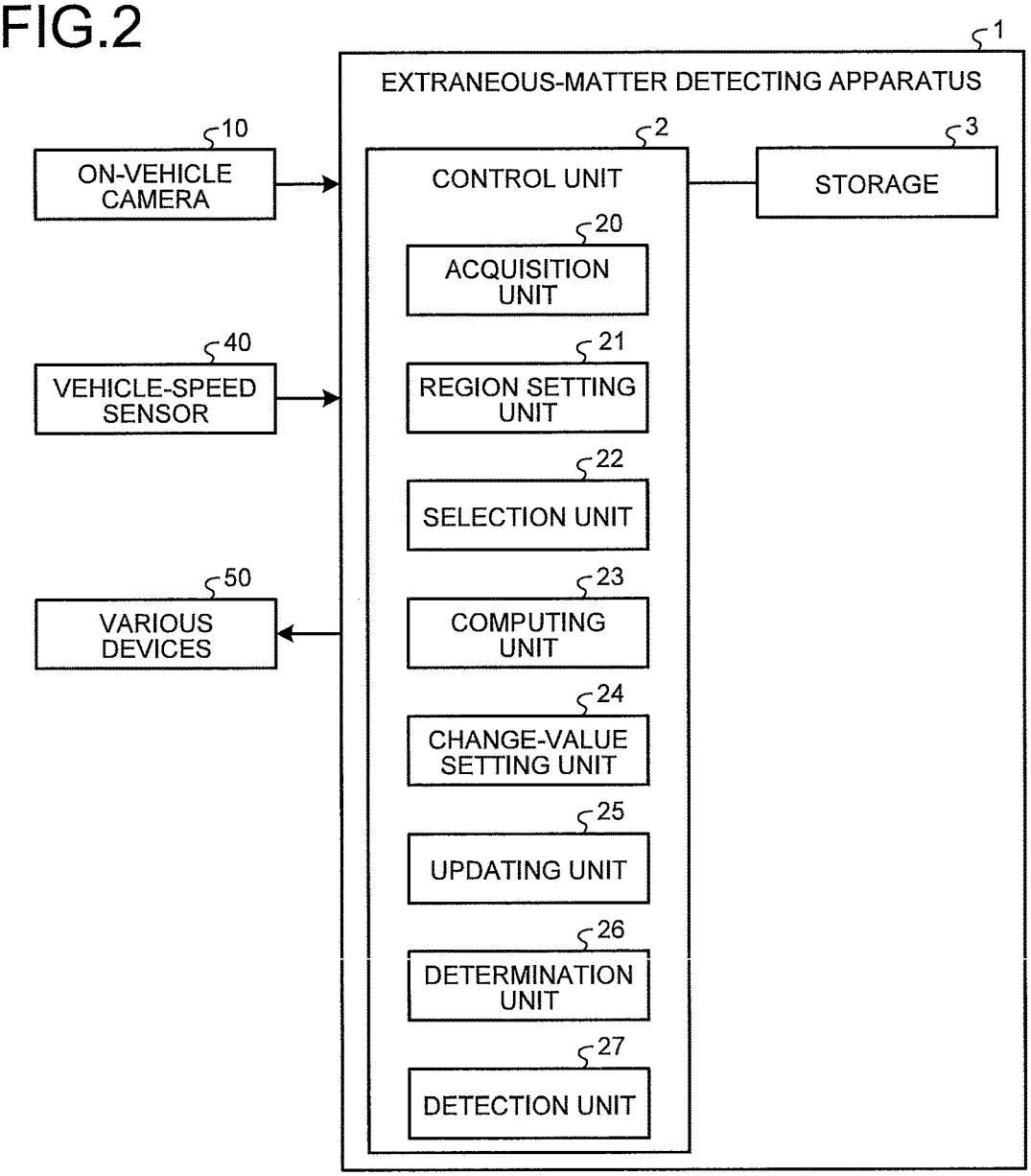

EXTRANEOUS-MATTER DETECTING APPARATUS AND EXTRANEOUS-MATTER DETECTING METHOD

CROSS-REFERENCE TO RELATED APPLICATION

This application is based upon and claims the benefit of priority of the prior Japanese Patent Application No. 2018-247679, filed on Dec. 28, 2018, the entire contents of which are incorporated herein by reference.

FIELD

The embodiment discussed herein is directed to an extraneous-matter detecting apparatus and an extraneous-matter detecting method.

BACKGROUND

Conventionally, there has been known an extraneous-matter detecting apparatus that detects an extraneous matter having adhered to a lens on the basis of a time-series change in a luminance value of a divided region in a captured image (see, for example, Japanese Laid-open Patent Publication No. 2014-030188).

However, in the conventional technology, for example, in a case where a gain correction is executed in the image capturing device, the luminance value of the divided region is changed even when the extraneous matter has adhered. Thus, in the conventional technology, there presents possibility that presence/absence of the extraneous matter is not able to be precisely determined.

SUMMARY

An extraneous-matter detecting apparatus according to an embodiment includes a region setting unit, a computing unit, a change-value setting unit, an updating unit, and a detection unit. The region setting unit sets, for a captured image captured by an image capturing device, a plurality of divided regions. The computing unit computes (i) a first difference between a past representative value of luminance and a present representative value of luminance in a corresponding divided region and (ii) a second difference between a past dispersion amount of luminance and a present dispersion amount of luminance in the corresponding divided region. The change-value setting unit sets, based on the first difference and the second difference, a change value of a counter value that indicates an adhesion state of an extraneous matter in the divided region. The updating unit updates the counter value based on the change value. The detection unit detects, based on the counter value, an adhesion state of an extraneous matter in the divided region.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein:

FIG. 2 is a block diagram illustrating a configuration of an extraneous-matter detecting apparatus;

FIG. 3 is a diagram illustrating a change value of a counter value;

DESCRIPTION OF EMBODIMENTS

Hereinafter, an embodiment of an extraneous-matter detecting apparatus and an extraneous-matter detecting method according to the present application will be described in detail with reference to the accompanying drawings. The present disclosure is not limited to the embodiment described in the following.

Figure 1:
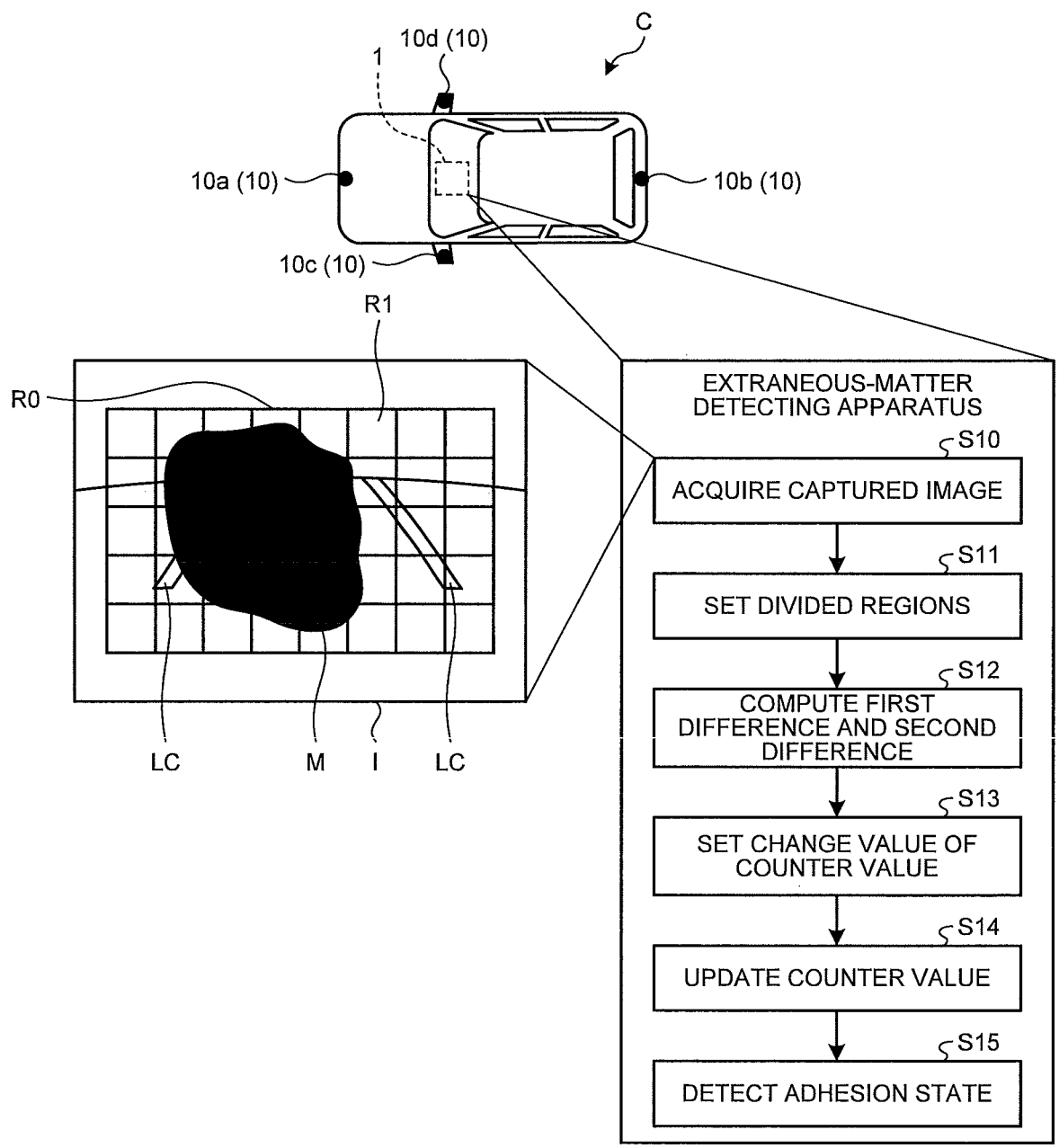
FIG. 1 is a diagram illustrating the outline of an extraneous-matter detecting method.

The outline of an extraneous-matter detecting method according to the embodiment will be explained with reference to FIG. 1. FIG. 1 is a diagram illustrating the outline of an extraneous-matter detecting method. The extraneous-matter detecting method according to the embodiment is executed by an extraneous-matter detecting apparatus 1.

The extraneous-matter detecting apparatus 1 is provided in a vehicle C, for example, and detects adhesion of an extraneous matter to an on-vehicle camera 10 (image capturing device) that captures the periphery of the vehicle C, specifically, adhesion of an extraneous matter to a lens of the on-vehicle camera 10.

The on-vehicle camera 10 captures the periphery of the vehicle C. The on-vehicle camera 10 includes image capturing elements such as a Charge Coupled Device (CCD) and a Complementary Metal Oxide Semiconductor (CMOS). The on-vehicle camera 10 includes, for example, a front camera 10a that captures the front of the vehicle C, a rear camera 10b that captures the rear of the vehicle C, a left camera 10c that captures the left of the vehicle C, and a right camera 10d that captures the right of the vehicle C.

When a light-blocking extraneous matter M, such as mud and dust, has adhered to a lens of the on-vehicle camera 10, information on the periphery of the vehicle C, for example, information on a parking-frame LC, another vehicle, and a person, is not acquired from a captured image I obtained by the on-vehicle camera 10, so that there presents possibility that the parking-frame LC, another vehicle, a person, etc. are not able to be precisely detected. In FIG. 1, an image is exemplified in which the parking-frames LC are captured as the captured image I and mud has adhered to a lens as the extraneous matter M. Note that the extraneous matter M may include a raindrop, a snowflake, etc.

Thus, an object of the extraneous-matter detecting apparatus 1 according to the embodiment includes to precisely detect presence/absence of an extraneous matter adhering to a lens of the on-vehicle camera 10.

The extraneous-matter detecting apparatus 1 acquires the captured image I that is captured by the on-vehicle camera 10 (Step S10).

The extraneous-matter detecting apparatus 1 sets a plurality of divided regions R1 in a target region R0 for detecting adhesion of the extraneous matter M (Step S11). The target region R0 is a region that is previously set in the captured image I, and is a region in which a process using the captured image I, such as a process for detecting the parking-frame LC and a self-parking process, is not able to be precisely executed when the extraneous matter M has adhered to a lens. The target region R0 is a rectangular region, for example.

The divided regions R1 are regions formed by dividing the target region R0 in a longitudinal direction and a lateral direction. Each of the divided regions R1 includes a plurality of pixels. For example, the divided region R1 is a rectangular region that includes 40×40 pixels.

In the captured image I illustrated in FIG. 1, the forty divided regions R1 are illustrated as one example, which are obtained by longitudinally dividing the target region R0 into five portions and further laterally dividing the target region R0 into eight portions; however, not limited thereto.

The extraneous-matter detecting apparatus 1 computes a first difference and a second difference (Step S12).

The first difference is a difference between (i) a representative value of the luminance in the divided regions R1 of the present captured image I (hereinafter, may be referred to as "present frame I1") and (ii) a representative value of the luminance in the divided regions R1 of the captured image I (hereinafter, may be referred to as "past frame I0") that is acquired in a process just before the present frame I1. Specifically, the representative value indicates an average value. Note that the first difference is an absolute value.

The divided region R1 in the present frame I1 and that in the past frame I0, which are used in computing the first difference and the second difference, are the divided regions R1 whose positions are the same with respect to the target region R0. Hereinafter, the above-mentioned divided region R1 may be referred to as the "same divided region R1".

The second difference is a difference between dispersion amounts of the luminance in the same divided region R1. Specifically, the dispersion amount is a standard deviation. The second difference is an absolute value.

The extraneous-matter detecting apparatus 1 sets, on the basis of the first difference and the second difference, a change value of a counter value, which indicates continuity of an adhesion state of an extraneous matter in the divided region R1 (Step S13).

Specifically, when the first difference is equal to or less than a first predetermined difference and the second difference is equal to or less than a second predetermined difference, the extraneous-matter detecting apparatus 1 sets, to a first addition value, a change value of a counter value.

The first predetermined difference is an upper-limit difference of a representative value of the luminance when the extraneous matter M has adhered, and is a difference that is previously set by an experiment and the like. The first predetermined difference is "5", for example.

The second predetermined difference is an upper-limit difference of a dispersion amount of the luminance when the extraneous matter M has adhered, and is a difference that is previously set by an experiment and the like. The second predetermined difference is "1", for example.

The first addition value is a previously-set value, and is "+1", for example.

When a first difference is larger than the first predetermined difference and a second difference is larger than the second predetermined difference, the extraneous-matter detecting apparatus 1 sets, to a first subtraction value (first change value), a change value of a counter value. The first subtraction value is a previously-set value, and is "−5", for example.

When a first difference is larger than the first predetermined difference and a second difference is equal to or less than the second predetermined difference, the extraneous-matter detecting apparatus 1 sets, to a second subtraction value (second change value), a change value of a counter value. The second subtraction value is a previously-set value, which is smaller than a first subtraction value, and is "−1", for example. That a subtraction value is small means that an absolute value of the subtraction value is small.

The extraneous-matter detecting apparatus 1 updates a counter value on the basis of a change value (Step S14), and further detects an adhesion state of the extraneous matter M in the divided regions R1 on the basis of the counter value (Step S15).

Specifically, when a counter value is equal to or larger than a predetermined counter value, the extraneous-matter detecting apparatus 1 detects the divided region R1 as an adhesion region to which the extraneous matter M has adhered. When a counter value is smaller than the predetermined counter value, the extraneous-matter detecting apparatus 1 detects the divided region R1 as a non-adhesion region to which the extraneous matter M has not adhered. The predetermined counter value is a previously-set value.

The extraneous-matter detecting apparatus 1 sets, on the basis of a first difference and a second difference, a change value of a counter value so as to update the counter value, and detects, on the basis of the updated counter value, an adhesion state of the extraneous matter M in the divided region R1. Thus, the extraneous-matter detecting apparatus 1 is capable of precisely determining the divided region R1 to which the extraneous matter M has adhered to be able to precisely detect an adhesion region. In other words, the extraneous-matter detecting apparatus 1 is capable of precisely detecting adhesion of the extraneous matter M to a lens of the on-vehicle camera 10.

Next, the extraneous-matter detecting apparatus 1 will be explained with reference to FIG. 2. FIG. 2 is a block diagram illustrating a configuration of the extraneous-matter detecting apparatus 1.

The extraneous-matter detecting apparatus 1 is connected to the on-vehicle camera 10, a vehicle-speed sensor 40, and various devices 50. In FIG. 2, a case is exemplified in which the extraneous-matter detecting apparatus 1 is separately provided from the on-vehicle camera 10 and the various devices 50; however, not limited thereto, the extraneous-matter detecting apparatus 1 may be integrated with at least one of the on-vehicle camera 10 and the various devices 50.

Each of the various devices 50 is a device that acquires a detection result of the extraneous-matter detecting apparatus 1 to execute various controls on the vehicle C. The various devices 50 include, for example, a display, a removal device, and a vehicle controller. The display informs of adhesion of the extraneous matter M to a lens of the on-vehicle camera 10 and a wiping-away instruction of the extraneous matter M by a user. The removal device ejects fluid, gas, and the like toward a lens so as to remove the extraneous matter M. The vehicle controller controls autonomous driving and the like.

The extraneous-matter detecting apparatus 1 includes a control unit 2 and a storage 3. The control unit 2 includes an acquisition unit 20, a region setting unit 21, a selection unit 22, a computing unit 23, a change-value setting unit 24, an updating unit 25, a determination unit 26, and a detection unit 27.

The extraneous-matter detecting apparatus 1 includes a computer that includes, for example, a Central Processing Unit (CPU), a Read Only Memory (ROM), a Random Access Memory (RAM), a data flash, and an input/output port; and various circuits.

The CPU of the computer reads and executes, for example, a program stored in the ROM so as to function as the acquisition unit 20, the region setting unit 21, the selection unit 22, the computing unit 23, the change-value setting unit 24, the updating unit 25, the determination unit 26, and the detection unit 27 of the control unit 2.

At least one or all of the acquisition unit 20, the region setting unit 21, the selection unit 22, the computing unit 23, the change-value setting unit 24, the updating unit 25, the determination unit 26, and the detection unit 27 of the control unit 2 may be constituted of hardware such as an Application Specific Integrated Circuit (ASIC) and a Field Programmable Gate Array (FPGA). Any of the acquisition unit 20, the region setting unit 21, the selection unit 22, the computing unit 23, the change-value setting unit 24, the updating unit 25, the determination unit 26, and the detection unit 27 may be integrated with each other or may be divided into a plurality of parts.

The acquisition unit 20 acquires a vehicle speed on the basis of a signal transmitted from the vehicle-speed sensor 40. The acquisition unit 20 acquires an image that is captured by the on-vehicle camera 10, and generates the present frame I1 that is the present captured image I. Specifically, the acquisition unit 20 executes a gray-scaling process for converting each pixel in the acquired image into a corresponding gradation from white to black in accordance with its luminance. The acquisition unit 20 executes a pixel thinning process on the acquired image so as to generate an image having a smaller size than that of the acquired image.

The acquisition unit 20 generates, on the basis of the image on which the thinning process has executed, the present frame I1 including an integral image obtained by summing up pixel values of pixels and an integral image obtained by summing up squares of pixel values of the pixels. The pixel value indicates information corresponding to the luminance and the edge of a pixel. As described above, the extraneous-matter detecting apparatus 1 executes the thinning process on the acquired image and generates an integral image to be able to speed up calculations in the following processes, so that it is possible to shorten a processing time interval for detecting the extraneous matter M.

Note that the acquisition unit 20 may execute, on the pixels, a smoothing process by using a smoothing filter such as an averaging filter. The acquisition unit 20 may generate (acquire), without executing the thinning process, the present frame I1 having a size that is the same as that of the acquired image.

The region setting unit 21 sets, for the present frame I1, the target region R0 and the divided regions R1. The region setting unit 21 sets, for previously set positions in each of the captured images I, the target region R0 and the divided regions R1.

The selection unit 22 selects the divided region R1. Specifically, the selection unit 22 selects, from among the divided regions R1 of the present frame I1, the divided region R1 whose counter value is not updated.

The computing unit 23 detects a luminance of each pixel included in the target region R0 of the present frame I1, and computes a representative value of the luminance and a dispersion amount of the luminance in the target region R0 of the present frame I1. The computing unit 23 computes a representative value of the luminance and a dispersion amount of the luminance in each of the divided regions R1 of the present frame I1. The representative value is a value that indicates a representative luminance in a distribution of the luminance in a target region, specifically, an average value is used. In addition to the average value, a trimmed mean, a median, a mode, or the like may be used. The dispersion amount is a value that indicates the spread of a distribution of the luminance in a target region, specifically, a standard deviation is used. In addition to the standard deviation, the dispersion, a maximum/minimum width, a quartile width, an arbitrary percentile width, or the like may be used. Hereinafter, the case will be exemplified in which an average value is used as a representative value and a standard deviation is used as a dispersion amount.

The computing unit 23 computes a first difference that is a difference between average values of the luminance in the same divided region R1. The computing unit 23 computes a second difference that is a difference between standard deviations of the luminance in the same divided region R1.

The computing unit 23 computes an occupancy that is a ratio of an adhesion region to the target region R0. The occupancy is computed by dividing a value obtained by totaling areas of adhesion regions, which are the divided regions R1 to which the extraneous matter M has adhered, by an area of the target region R0. The occupancy may be computed by dividing the number of the adhesion regions by the number of the divided regions R1 included in the target region R0. The occupancy is expressed as a percentage, for example.

The computing unit 23 excepts the divided regions R1 in which the own vehicle C appears from the captured image I in which the own vehicle C appears, for example, the captured image I that is captured by the left camera 10c and/or the right camera 10d (see FIG. 1), so as to compute an occupancy. The divided regions R1, in which the own vehicle C appears, are previously set.

The change-value setting unit 24 sets, on the basis of a first difference and a second difference, a change value of a counter value of the divided region R1. As illustrated in FIG. 3, the change-value setting unit 24 sets, the change value of the counter value on the basis of the first difference and the second difference. FIG. 3 is a diagram illustrating a change value of a counter value.

Specifically, when a first difference is equal to or less than the first predetermined difference and a second difference is equal to or less than the second predetermined difference, the change-value setting unit 24 sets a change value to a first addition value (for example, "+1"). When a first difference is larger than the first predetermined difference and a second difference is larger than the second predetermined difference, the change-value setting unit 24 sets a change value to a first subtraction value (for example, "−5"). When a first difference is larger than the first predetermined difference and a second difference is equal to or less than the second predetermined difference, the change-value setting unit 24 sets a change value to a second subtraction value (for example, "−1") that is smaller than the first subtraction value.

The updating unit 25 updates a counter value in the divided region R1. The updating unit 25 adds or subtracts a change value, which is set by the change-value setting unit 24, to or from a present counter value so as to update the counter value. A previously-set upper limit counter value and a previously-set lower limit counter value are set for the counter value.

The determination unit 26 determines whether or not a vehicle speed is equal to or less than a predetermined vehicle speed. The predetermined vehicle speed is a previously-set vehicle speed, and further is a vehicle speed at which the captured image I with little blur and capable of detecting the extraneous matter M is able to be obtained. For example, the predetermined vehicle speed is 80 km/h.

The determination unit 26 determines whether or not the present frame I1 is a low-illuminance image. Specifically, the determination unit 26 determines whether or not an average value of the luminance in the target region R0 of the present frame I1 is equal to or less than a predetermined low-illuminance value and a standard deviation of the luminance in the target region R0 of the present frame I1 is equal to or less than a predetermined low-illuminance deviation. The predetermined low-illuminance value is a previously-set value, for example, "85". The predetermined low-illuminance deviation is a previously-set value, for example, "50".

When an average value of the luminance in the target region R0 of the present frame I1 is equal to or less than a predetermined low-illuminance value and a standard deviation of the luminance in the target region R0 of the present frame I1 is equal to or less than a predetermined low-illuminance deviation, the determination unit 26 determines that the present frame I1 is a low-illuminance image. When an average value of the luminance in the target region R0 of the present frame I1 is larger than a predetermined low-illuminance value, the determination unit 26 determines that the present frame I1 is not a low-illuminance image, namely, is a non-low-illuminance image. When a standard deviation of the luminance in the target region R0 of the present frame I1 is larger than the predetermined low-illuminance deviation, the determination unit determines that the present frame I1 is a non-low-illuminance image.

When a vehicle speed is equal to or less than the predetermined vehicle speed and the present frame I1 is the non-low-illuminance image, the determination unit 26 determines (1) whether or not a first difference is equal to or less than the first predetermined difference and (2) whether or not a second difference is equal to or less than the second predetermined difference.

When a vehicle speed is larger than the predetermined vehicle speed or when the present frame I1 is a low-illuminance image, the determination unit 26 does not execute the above-mentioned determination (1) and the above-mentioned determination (2).

The determination unit 26 determines whether or not the divided region R1 is an adhesion region. Specifically, the determination unit 26 determines whether or not a counter value in the divided region R1 of the present frame I1 is equal to or larger than the predetermined counter value.

When the counter value updated by the updating unit 25 is equal to or larger than the predetermined counter value, the determination unit 26 determines that the divided region R1 is an adhesion region. When a counter value of the divided region R1 in the present frame I1 is smaller than the predetermined counter value, the determination unit 26 determines that the divided region R1 is not an adhesion region but a non-adhesion region.

Note that hysteresis may be set for the predetermined counter value. In other words, the predetermined counter value when a determination of the divided region R1 is changed from a non-adhesion region to an adhesion region may differ from the predetermined counter value (different threshold) when a determination of the divided region R1 is changed from an adhesion region to a non-adhesion region.

The determination unit 26 determines whether or not counter values of all of the divided regions R1 in the present frame I1 have been updated.

The determination unit 26 determines whether or not the extraneous matter M has adhered to a lens of the on-vehicle camera 10. Specifically, the determination unit 26 determines whether or not an occupancy is equal to or larger than a predetermined occupancy. The predetermined occupancy is a previously-set value, for example, 40%. When the occupancy is equal to or larger than the predetermined occupancy, the determination unit 26 determines that the extraneous matter M has adhered to the lens of the on-vehicle camera 10. When the occupancy is smaller than the predetermined occupancy, the determination unit 26 determines that the extraneous matter M has not adhered to the lens of the on-vehicle camera 10.

The detection unit 27 detects, as an adhesion region, the divided region R1 determined that the extraneous matter M has adhered thereto. The detection unit 27 detects, as a non-adhesion region, the divided region R1 determined that the extraneous matter M has not adhered thereto.

When a vehicle speed is larger than a predetermined vehicle speed, or when the present frame I1 is a low-illuminance image, the detection unit 27 does not execute, on the present frame I1, detection of an adhesion region in the divided region R1.

When determining that the extraneous matter M has adhered to a lens of the on-vehicle camera 10, the detection unit 27 detects adhesion of the extraneous matter M to the on-vehicle camera 10. Specifically, when determining that the extraneous matter M has adhered to the lens of the on-vehicle camera 10, the detection unit 27 turns "ON" an extraneous-matter detecting flag. When determining that the extraneous matter M has not adhered to the on-vehicle camera 10, the detection unit 27 turns "OFF" the extraneous-matter detecting flag.

When the present frame I1 is a low-illuminance image, the detection unit 27 turns "OFF" the extraneous-matter detecting flag.

The storage 3 corresponds to a RAM and/or a data flash, for example. The RAM and the data flash are capable of storing therein information on various programs and threshold information on average values of the luminance in the divided regions R1, standard deviations of the luminance in the divided regions R1, counter values of the divided regions R1, the first predetermined difference, etc. Note that the extraneous-matter detecting apparatus 1 may acquire the above-mentioned programs and the various kinds of information via another computer connected thereto via a wired/wireless network or a portable recording medium.

Figure 4:
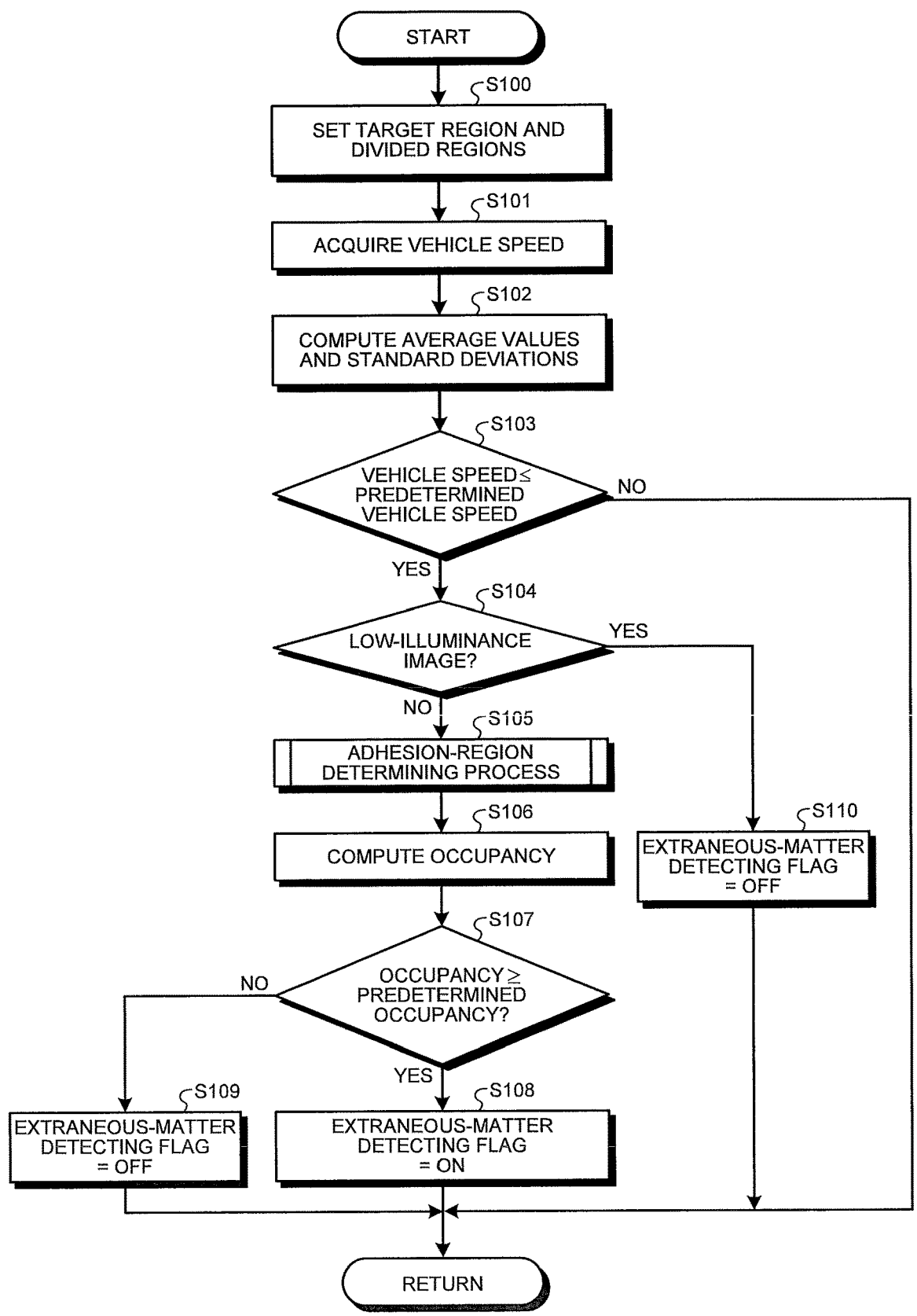
FIG. 4 is a flowchart illustrating an extraneous-matter detecting process.

Next, the extraneous-matter detecting process according to the embodiment will be explained with reference to FIG. 4. FIG. 4 is a flowchart illustrating the extraneous-matter detecting process. The extraneous-matter detecting process is executed in each of the on-vehicle cameras 10.

The extraneous-matter detecting apparatus 1 generates the present frame I1 from an image captured by the on-vehicle camera 10, and sets the target region R0 and the divided regions R1 (Step S100). The extraneous-matter detecting apparatus 1 acquires a vehicle speed (Step S101).

The extraneous-matter detecting apparatus 1 computes an average value of the luminance in the target region R0 of the present frame I1, a standard deviation of the luminance in the target region R0 of the present frame I, an average value of the luminance in each of the divided regions R1 of the present frame I1, and a standard deviation of the luminance in each of the divided regions R1 of the present frame I1 (Step S102).

The extraneous-matter detecting apparatus 1 determines whether or not a vehicle speed is equal to or less than a predetermined vehicle speed (Step S103). When a vehicle speed is equal to or less than the predetermined vehicle speed (Step S103: Yes), the extraneous-matter detecting apparatus 1 determines whether or not the present frame I1 is a low-illuminance image (Step S104). When a vehicle speed is larger than the predetermined vehicle speed (Step S103: No), the extraneous-matter detecting apparatus 1 ends the present processing.

When the present frame I1 is not a low-illuminance image (Step S104: No), in other words, when the present frame I1 is a non-low-illuminance image, the extraneous-matter detecting apparatus 1 executes an adhesion-region determining process (Step S105). Details of the adhesion-region determining process will be mentioned later.

The extraneous-matter detecting apparatus 1 computes an occupancy in the present frame I1 (Step S106). The extraneous-matter detecting apparatus 1 determines whether or not the occupancy is equal to or larger than a predetermined occupancy (Step S107).

When the occupancy is equal to or larger than the predetermined occupancy (Step S107: Yes), the extraneous-matter detecting apparatus 1 turns "ON" an extraneous-matter detecting flag (Step S108). When the occupancy is smaller than the predetermined occupancy (Step S107: No), the extraneous-matter detecting apparatus 1 turns "OFF" the extraneous-matter detecting flag (Step S109).

When the present frame I1 is a low-illuminance image (Step S104: Yes), the extraneous-matter detecting apparatus 1 turns "OFF" the extraneous-matter detecting flag (Step S110). In other words, when the present frame I1 is a low-illuminance image, the extraneous-matter detecting apparatus 1 does not execute a detection of an adhesion region on the divided regions R1 without executing the adhesion-region determining process.

Figure 5:
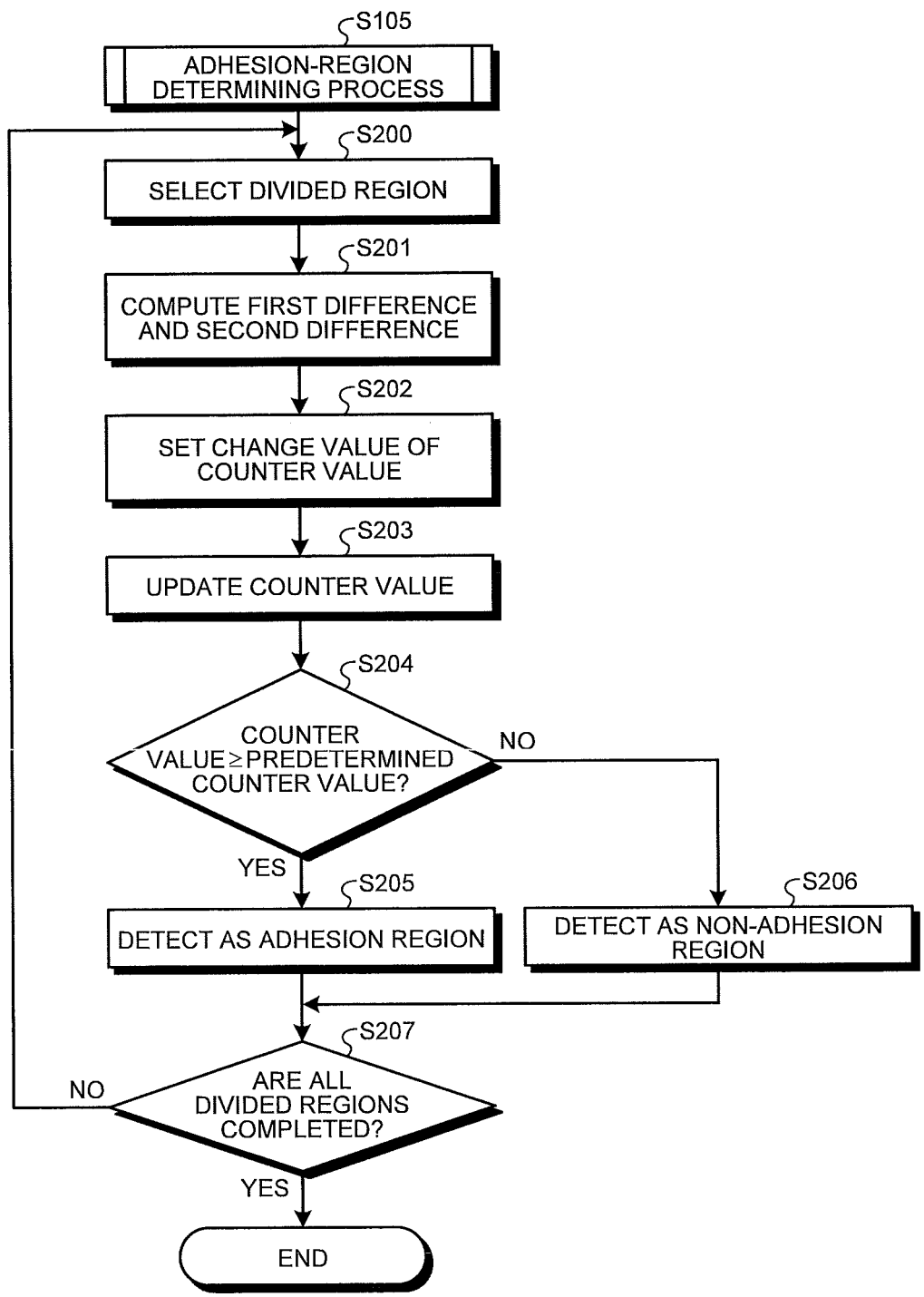
FIG. 5 is a flowchart illustrating an adhesion-region determining process.

Next, the adhesion-region determining process will be explained with reference to FIG. 5. FIG. 5 is a flowchart illustrating the adhesion-region determining process.

The extraneous-matter detecting apparatus 1 selects the divided region R1 (Step S200). Specifically, the extraneous-matter detecting apparatus 1 selects, from among the divided regions R1 of the present frame I1, the divided region R1 whose counter value has not been updated.

The extraneous-matter detecting apparatus 1 computes a first difference and a second difference in the selected divided region R1 (Step S201). The extraneous-matter detecting apparatus 1 may previously compute a first difference and a second difference in each of the divided regions R1, and may read out a first difference and a second difference that are corresponding to the selected divided region R1.

The extraneous-matter detecting apparatus 1 sets a change value of a counter value in the divided region R1 (Step S202). The extraneous-matter detecting apparatus 1 updates the counter value of the divided region R1 (Step S203). The extraneous-matter detecting apparatus 1 adds or subtracts the change value to or from a present counter value so as to update the counter value.

The extraneous-matter detecting apparatus 1 determines whether or not the counter value is equal to or larger than a predetermined counter value (Step S204). When the counter value is equal to or larger than the predetermined counter value (Step S204: Yes), the extraneous-matter detecting apparatus 1 detects, as an adhesion region, the divided region R1 (Step S205). When the counter value is smaller than the predetermined counter value (Step S204: No), the extraneous-matter detecting apparatus 1 detects, as a non-adhesion region, the divided region R1 (Step S206).

When the counter value is updated for all of the divided regions R1 (Step S207: Yes), the extraneous-matter detecting apparatus 1 ends the adhesion-region determining process. When there presents the divided region R1 whose counter value has not been updated yet (Step S207: No), the extraneous-matter detecting apparatus 1 newly selects the divided region R1 (Step S200), and repeatedly executes the above-mentioned process.

The extraneous-matter detecting apparatus 1 sets, on the basis of a first difference of an average value of the luminance in the same divided region R1 and a second difference of a standard deviation of the luminance in the same divided region R1, a change value of a counter value in the divided region R1. The extraneous-matter detecting apparatus 1 updates, on the basis of the change value, a counter value, and detects, on the basis of the counter value, an adhesion state of the extraneous matter M in the divided region R1.

Thus, the extraneous-matter detecting apparatus 1 updates a counter value by using a change value of the counter value, which is set on the basis of a first difference of an average value of the luminance in the same divided region R1 and a second difference of a standard deviation of the luminance in the same divided region R1, so that it is possible to precisely detect an adhesion state of an extraneous matter in the divided region R1. In other words, the extraneous-matter detecting apparatus 1 is capable of precisely detecting an adhesion of the extraneous matter M to the divided region R1. Moreover, the extraneous-matter detecting apparatus 1 is capable of precisely detecting an adhesion of the extraneous matter M to the divided region R1 even when a gain correction is executed on the on-vehicle camera 10. Thus, the extraneous-matter detecting apparatus 1 is capable of precisely detecting an adhesion of the extraneous matter M to a lens of the on-vehicle camera 10.

Figure 6A:
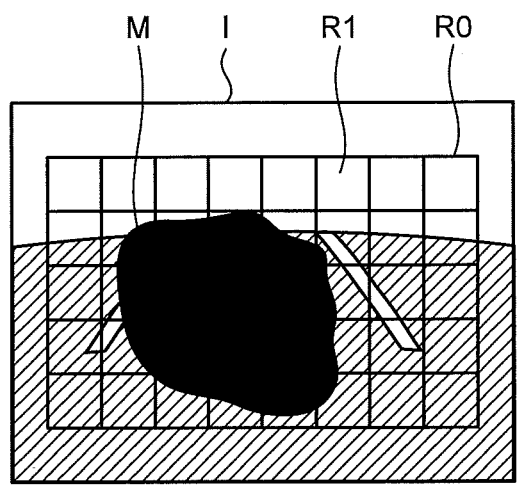
FIG. 6A is a diagram illustrating one example of a captured image in which an extraneous matter has adhered.
Figure 6B:
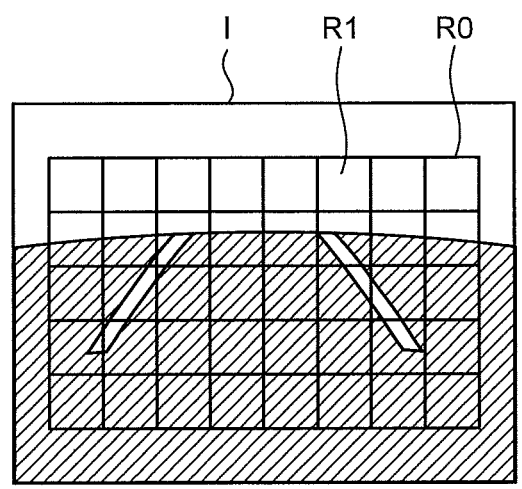
FIG. 6B is a diagram illustrating one example of a captured image when the extraneous matter is wiped away from the captured image illustrated in FIG. 6A.

For example, in the captured image I illustrated in FIG. 6A, when the extraneous matter M having adhered to the on-vehicle camera 10 is wiped away, as illustrated in FIG. 6B, whole of the background appears on the captured image I. FIG. 6A is a diagram illustrating one example of the captured image I in which the extraneous matter M has adhered. FIG. 6B is a diagram illustrating one example of the captured image I when the extraneous matter M is wiped away from the captured image I illustrated in FIG. 6A.

For example, when the background is an asphalt road surface (see hatched regions illustrated in FIGS. 6A and 6B), in the divided region R1 in which the extraneous matter M has adhered, there presents, in some cases, a case where a first difference becomes larger than the first predetermined difference and a second difference becomes, on the contrary, equal to or less than the second predetermined difference before and after absence of the extraneous matter M (for example, before and after extraneous matter M is wiped away).

When a gain correction is executed in the on-vehicle camera 10, in the divided region R1 to which the extraneous matter M has adhered, there presents, in some cases, a case where a first difference becomes larger than the first predetermined difference and a second difference becomes, on the contrary, equal to or less than the second predetermined difference before and after the execution of the gain correction.

As described above, when a first difference, which is a difference between average values of the luminance in the same divided region R1, becomes larger than the first predetermined difference, and a second difference, which is a difference between standard deviations of the luminance in the same divided region R1, becomes equal to or less than the second predetermined difference, there presents, in some cases, a case where determining whether or not the extraneous matter M is actually absent is difficult.

On the other hand, when the first difference is larger than the first predetermined difference and further the second difference is larger than the second predetermined difference, the extraneous-matter detecting apparatus 1 sets a change value of a counter value to a first subtraction value. When the first difference is larger than the first predetermined difference and the second difference is equal to or less than the second predetermined difference, the extraneous-matter detecting apparatus 1 sets a change value of a counter value to a second subtraction value that is smaller than the first subtraction value.

Thus, when a first difference, which is a difference between average values of the luminance in the same divided region R1, is larger than the first predetermined difference, and a second difference, which is a difference between standard deviations of the luminance in the same divided region R1, is equal to or less than the second predetermined difference, the extraneous-matter detecting apparatus 1 is capable of preventing a large reduction in the counter value. Thus, the extraneous-matter detecting apparatus 1 is capable of preventing a large change in the counter value when whether or not the extraneous matter M is absence is not clear. In other words, the extraneous-matter detecting apparatus 1 is capable of preventing occurrence of an erroneous determination with respect to removal of the extraneous matter M, for example, wiping away of the extraneous matter M.

The extraneous-matter detecting apparatus 1 according to a modification may set a counter value on the basis of an average value of the luminance in the divided regions R1. In other words, the extraneous-matter detecting apparatus 1 according to the modification may set a counter value on the basis of the first difference, the second difference, and the average value of the luminance in the divided regions R1.

In the extraneous-matter detecting apparatus 1 according to the modification, the first predetermined difference, the change value, etc. may be set in response to a process for correcting luminance, color, and brightness in addition to the gain correction of the on-vehicle camera 10.

In the extraneous-matter detecting apparatus 1 according to the modification, the first predetermined difference, the change value, etc. may be set for each of the on-vehicle cameras 10.

The change value for updating the counter value may be set in accordance with performance of the on-vehicle camera 10.

For example, the extraneous-matter detecting apparatus 1 according to the modification may set, when a first difference is equal to or less than the first predetermined difference and a second difference is equal to or less than the second predetermined difference, a change value to a subtraction value, and may set, when the first difference is larger than the first predetermined difference and the second difference is larger than the second predetermined difference, the change value to an addition value. The extraneous-matter detecting apparatus 1 according to the modification may detect, as an adhesion region, the divided region R1 when a counter value is equal to or less than a predetermined counter value.

According to one aspect of the embodiment, it is possible to precisely determine presence/absence of the extraneous matter.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An extraneous-matter detecting apparatus comprising:
   a processor programmed to:
      set a plurality of divided regions for a captured image captured by an image capturing device, the captured image being a target region for detecting adhesion of an extraneous matter;
      calculate, for each divided region of the plurality of divided regions, (i) a first difference between a past representative value of luminance and a present representative value of luminance in a corresponding divided region and (ii) a second difference between a past dispersion amount of luminance and a present dispersion amount of luminance in the corresponding divided region;
      set a change value of a counter value that indicates an adhesion state of the extraneous matter in the divided region based on the first difference and the second difference;
      update the counter value based on the set change value; and
      determine, for each divided region of the plurality of divided regions, a presence or absence of the extraneous matter based on the counter value to detect an adhesion state of the extraneous matter in the target region including the plurality of divided regions.

2. The extraneous-matter detecting apparatus according to claim 1, wherein the processor is programmed to:
   compute, as the past and present representative values, an average value of luminance in the corresponding divided region; and
   compute, as the past and present dispersion amounts, a standard deviation of luminance in the corresponding divided region.

3. An extraneous-matter detecting apparatus comprising:
   a processor programmed to:
      set a plurality of divided regions for a captured image captured by an image capturing device;
      calculate, for each divided region of the plurality of divided regions, (i) a first difference between a past representative value of luminance and a present representative value of luminance in a corresponding divided region and (ii) a second difference between a past dispersion amount of luminance and a present dispersion amount of luminance in the corresponding divided region;
      set a change value of a counter value that indicates an adhesion state of an extraneous matter in the divided region based on the first difference and the second difference, and the change value being set to:
         a first change value when the first difference is larger than a first predetermined difference and the second difference is larger than a second predetermined difference, and
         a second change value, which is smaller than the first change value, when the first difference is larger than the first predetermined difference and the second difference is equal to or less than the second predetermined difference, update the counter value based on the set change value; and detect an adhesion state of the extraneous matter in the divided region based on the counter value.

4. An extraneous-matter detecting apparatus comprising: a processor programmed to:

set a plurality of divided regions for a captured image captured by an image capturing device;

calculate, for each divided region of the plurality of divided regions, (i) a first difference between a past representative value of luminance and a present representative value of luminance in a corresponding divided region and (ii) a second difference between a past dispersion amount of luminance and a present dispersion amount of luminance in the corresponding divided region;

set a change value of a counter value that indicates an adhesion state of an extraneous matter in the divided region based on the first difference and the second difference, and the change value being set to:

a first addition value when the first difference is equal to or less than a first predetermined difference and the second difference is equal to or less than a second predetermined difference, a first subtraction value when the first difference is larger than the first predetermined difference and the second difference is larger than the second predetermined difference, and a second subtraction value, which is smaller than the first subtraction value, when the first difference is larger than the first predetermined difference and the second difference is equal to or less than the second predetermined difference, update the counter value based on the set change value;

detect an adhesion state of the extraneous matter in the divided region based on the counter value; and when the counter value is equal to or larger than a predetermined counter value, detect the divided region as an adhesion region to which the extraneous matter has adhered.

5. An extraneous-matter detecting method comprising:

setting, for a captured image captured by an image capturing device, a plurality of divided regions, the captured image being a target region for detecting adhesion of an extraneous matter;

calculating, for each divided region of the plurality of divided regions, (i) a first difference between a past representative value of luminance and a present representative value of luminance in a corresponding divided region and (ii) a second difference between a past dispersion amount of luminance and a present dispersion amount of luminance in the corresponding divided region;

setting a change value of a counter value that indicates an adhesion state of the extraneous matter in the divided region based on the first difference and the second difference;

updating the counter value based on the change value; and determine, for each divided region of the plurality of divided regions, a presence or absence of the extraneous matter based on the counter value to detect an adhesion state of the extraneous matter in the target region including the plurality of divided regions.

* * * * *